US008286080B2

(12) United States Patent
Tai et al.

(10) Patent No.: US 8,286,080 B2
(45) Date of Patent: Oct. 9, 2012

(54) USER NAVIGATION VIA VECTORS DYNAMICALLY MAPPED TO DISTINCT MEDIA ATTRIBUTES

(75) Inventors: Xiaorong Tai, Cary, NC (US); John Toebes, Cary, NC (US); David F. Baker, Raleigh, NC (US); Mark Lane Craig, Jr., Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1111 days.

(21) Appl. No.: 12/179,046

(22) Filed: Jul. 24, 2008

(65) Prior Publication Data

US 2010/0023862 A1     Jan. 28, 2010

(51) Int. Cl.
*G06F 3/048* (2006.01)
(52) U.S. Cl. ......... 715/721; 715/810; 715/822; 715/823
(58) Field of Classification Search .................. 715/721, 715/810, 822, 823
See application file for complete search history.

(56) References Cited

U.S. PATENT DOCUMENTS

| | | | | |
|---|---|---|---|---|
| 5,721,815 | A | * | 2/1998 | Ottesen et al. ................ 715/721 |
| 5,812,124 | A | * | 9/1998 | Eick et al. ........................ 725/45 |
| 5,886,691 | A | * | 3/1999 | Furuya et al. ................. 715/721 |
| 5,917,481 | A | * | 6/1999 | Rzeszewski et al. ......... 715/721 |
| 5,940,073 | A | * | 8/1999 | Klosterman et al. .......... 715/721 |
| 5,973,680 | A | * | 10/1999 | Ueda .............................. 715/721 |
| 6,005,565 | A | * | 12/1999 | Legall et al. ................... 715/721 |
| 6,037,933 | A | * | 3/2000 | Blonstein et al. ............. 715/721 |
| 6,075,527 | A | * | 6/2000 | Ichihashi et al. .............. 715/721 |
| 6,160,545 | A | * | 12/2000 | Eyer et al. ..................... 715/721 |
| 6,367,078 | B1 | | 4/2002 | Lasky |
| 6,385,619 | B1 | | 5/2002 | Eichstaedt et al. |
| 7,024,381 | B1 | * | 4/2006 | Hastings et al. ............. 705/27.1 |
| 7,561,214 | B1 | | 7/2009 | O'Callaghan |
| 2002/0152474 | A1 | | 10/2002 | Dudkiewicz |
| 2003/0106057 | A1 | | 6/2003 | Perdon |
| 2008/0104058 | A1 | | 5/2008 | Billmaier et al. |

OTHER PUBLICATIONS

U.S. Appl. No. 11/947,298, filed Nov. 29, 2007, Toebes et al.
U.S. Appl. No. 12/116,026, filed May 6, 2008, Toebes et al.
U.S. Appl. No. 12/109,549, filed Apr. 25, 2008, Toebes et al.
U.S. Appl. No. 12/110,224, filed Apr. 25, 2008, Toebes et al.
U.S. Appl. No. 12/110,238, filed Apr. 25, 2008, Davi et al.

(Continued)

*Primary Examiner* — Mark Rinehart
*Assistant Examiner* — Meseker Takele
(74) *Attorney, Agent, or Firm* — Leon R. Turkevich (57) ABSTRACT

In one embodiment, a method comprises generating and displaying to a user a user selection interface, the user selection interface representing a plurality of content selection vectors extending from its origin and mapped to respectively distinct media attributes within a prescribed attribute type; detecting a user input that extends from the origin toward at least one of the content selection vectors and that identifies a selected position within the user selection interface; displaying to the user an updated user selection interface representing a corresponding updated origin at the selected position and representing a plurality of updated content selection vectors having a determined relation to the at least one content selection vector; and selecting and displaying at least one identifier for a corresponding video content element having the corresponding media attribute having a highest correlation with the at least one content selection vector relative to the selected position from the origin.

22 Claims, 8 Drawing Sheets

OTHER PUBLICATIONS

"ChoiceStream RealRelevance Video Suite 2.0" [online], [retrieved on Apr. 21, 2008]. Retrieved from the Internet: <URL:http://www.choicestream.com/pdf/ChoiceStreasm_RRVS_Brochure-TV_ed.pdf>, 4 pages.

Gonzalez, "Taboola Lands $1.5 Million, Powers Video Discovery", [online], [retrieved on Jan. 28, 2008]. Retrieved from the Internet: <URL:http://www.techcrunch.com/2007/11/14/taboola-lands-15-million-powers-video-discovery>/, Nov. 14, 2007, pp. 1-4.

Wikipedia, "TiVo", [online], [retrieved on Apr. 25, 2008]. Retrieved from the Internet: <URL:http://en.wikipedia.org/w/index.php?title=TiVo&printable=yes>, pp. 1-7.

\* cited by examiner

USER NAVIGATION VIA VECTORS DYNAMICALLY MAPPED TO DISTINCT MEDIA ATTRIBUTES

TECHNICAL FIELD

The present disclosure generally relates to user navigation for selection of video content.

BACKGROUND

User navigation of video content historically has involved a user of a remote-control device "channel surfing" by sequentially advancing through available channels on a television set or a set-top box. However, as video content service providers (e.g., cable or satellite television companies) provide more content to subscribers by adding additional channels, users experience substantially more difficulty in attempting to locate preferred video content by channel surfing. In addition, proliferation of media content via wide area networks such as the Internet is inaccessible using conventional channel surfing techniques of sequentially advancing through a set of available channels. Video guides offered by content service providers via user set-top boxes also limit navigation by channel identifier, title, and/or time and date that the content is presented.

Users of personal computers can search for videos using different websites that offer videos on the World Wide Web (e.g., "netflix.com", "youtube.com"). In addition, various websites (e.g., "titan.tv") provide an online guide of television listings and channels offered by a given video service provider. Tivo allows users to perform a search for an actor, director, keyword, title, or category.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises generating and displaying to a user a user selection interface having an origin, the user selection interface representing a plurality of content selection vectors extending from the origin and mapped to respectively distinct media attributes within a prescribed attribute type; detecting a user input that extends from the origin toward at least one of the content selection vectors and that identifies a selected position within the user selection interface; generating and displaying to the user an updated user selection interface in response to the user input, the updated user selection interface having a corresponding updated origin at the selected position and representing a plurality of updated content selection vectors having a determined relation to the at least one content selection vector; and selecting and displaying to the user, concurrent with the displaying of the updated user selection interface, at least one identifier for a corresponding video content element having the corresponding media attribute having a highest correlation with the at least one content selection vector relative to the selected position from the origin.

In another embodiment, an apparatus comprises a processor circuit and a user interface circuit. The processor circuit is configured for generating, for display to a user, a user selection interface having an origin, the user selection interface representing a plurality of content selection vectors extending from the origin and mapped to respectively distinct media attributes within a prescribed attribute type. The user interface circuit is configured for detecting a user input that extends from the origin toward at least one of the content selection vectors and that identifies a selected position within the user selection interface. The processor circuit further is configured for generating, for display to the user, an updated user selection interface in response to the user input, the updated user selection interface having a corresponding updated origin at the selected position and representing a plurality of updated content selection vectors having a determined relation to the at least one content selection vector. The processor circuit further is configured for selecting, for display to the user concurrent with the display of the updated user selection interface, at least one identifier for a corresponding video content element having the corresponding media attribute having a highest correlation with the at least one content selection vector relative to the selected position from the origin.

DETAILED DESCRIPTION

Particular embodiments enable a user to simultaneously navigate in one or more dimensions using a user selection interface representing content selection vectors that can be dynamically mapped to distinct media attributes. User navigation is accomplished based on establishing content selection vectors that are mapped to distinct media attributes of video content elements, as opposed to the mere display of the source of the video content elements. For example, each video content element (e.g., a video clip, a full-length online movie, or a DVD) has multiple media attributes that are defined by prescribed media attribute types: prescribed attribute types can include genre, age category, MPAA rating, actors, duration, release date, user ratings, parental guide ratings, language, etc. Users also can define their own prescribed media attribute types for further classification of a video content element. Each prescribed media attribute type can have a set of distinct media attributes representing respective "values" of the media attribute type.

Hence, each prescribed attribute type (also referred to as attribute class) can include multiple distinct media attributes within the class, enabling video content elements to be distinguishable based on their respective media attributes relative to the attribute type. Example distinct media attributes within the "genre" media attribute type can include sports, news, science fiction, drama, etc. Hence, video content elements having the "sports" media attribute within the genre media attribute type can be distinguished from video content elements having the "romance" media attribute, or video content elements having the "science fiction" (or "Sci-Fi") media attribute. As apparent from the foregoing, certain media attributes within a prescribed attribute type can have distinct media attributes that are mutually exclusive (e.g., tragedy versus humor), although other distinct media attributes can have overlapping or complementary relationships (e.g., sports and humor, science fiction and humor, etc.).

In addition, relationships often can be established between different media attributes that are within different attribute types, for example in the case of an author who invariably writes romance films, or an actor who usually performs comedic roles. Further, the attribute types are not necessarily limited to factual information related to the video content element, but also can include "mood" attributes that are best suited or correlated to a given user mood. In particular, various video content elements can be identified as best suited for viewers in a particular mood, for example action movies versus more serious news programs or documentaries.

The assignment of a media attribute (e.g., a value of "romance") for a given media attribute type (e.g., "genre") to a specific video content element can establish a relationship between the media attribute and the specific video content element. Hence, all media attributes assigned to a specific video content element share an established relationship through their assignment to the same specific video content element. In other words, each video content element (e.g., a specific DVD) defines its own relationship between the domain of prescribed attribute types (e.g., genre, media type, duration, actors, awards, etc.) by its corresponding set of specific media attributes ("values") assigned to the video content element. Consequently, relationships can be established between different video content elements based on whether the video content elements share similar media attributes for a given prescribed attribute type (e.g., same genre), or whether the video content elements share distinctly different media attributes for a given prescribed attribute type (e.g., different genre).

According to the example embodiments, these relationships are presented to the user for selection based on presenting to the user a user selection interface representing multiple content selection vectors. The user selection interface can represent two content selection vectors extending in opposite directions from an origin, for example as a "slider" control offering one-dimensional navigation between the two content selection vectors relative to the origin. The user selection interface also can represent multiple content selection vectors in two or more dimensions (e.g., based on x-y coordinates or polar coordinates), where each content selection vector extends from an origin of the user selection interface and represents a distinct media attribute within a prescribed attribute type. For example, the user selection interface can represent the collection of content selection vectors that map to the distinct media attributes of humor, news, historical, science fiction, romance, drama, and sports within the prescribed attribute type of "genre".

In response to detecting a user input that extends from the origin toward at least one of the content selection vectors based on an identified position selected by the user within the user selection interface, the disclosed embodiments can generate and display to the user an updated user selection interface. The updated user selection interface can be generated based on selecting updated content selection vectors based on the identified position selected by the user, relative to the content selection vectors in proximity to the identified position; the updated content selection vectors also can be selected based on filtering available content selection vectors according to determined to user preferences. Hence, the updated user selection interface includes a corresponding updated origin that matches the identified position selected by the user within the prior user selection interface, and updated content selection vectors that have a determined relation to the at least one content selection vector, for example specific subcategories of the one content selection vector of the prior user selection interface. Hence, a user can navigate toward preferred content based on exploiting multidimensional navigation using content selection vectors that are updated in response to each user selection input.

Further, the example embodiments can select and display to the user, concurrent with the updated user selection interface, one or more identifiers for recommended video content elements: the recommended video content elements can be selected based on each having one or more media attributes that have the highest correlation relative to the selected position within the original user selection interface is detected by the user selection input. Hence, the most appropriate recommended video content elements can be presented to the user in the form of a matching video list specifying identifiers for the recommended video content elements, where the matching video list can be dynamically updated in response to each user input.

Figure 1:
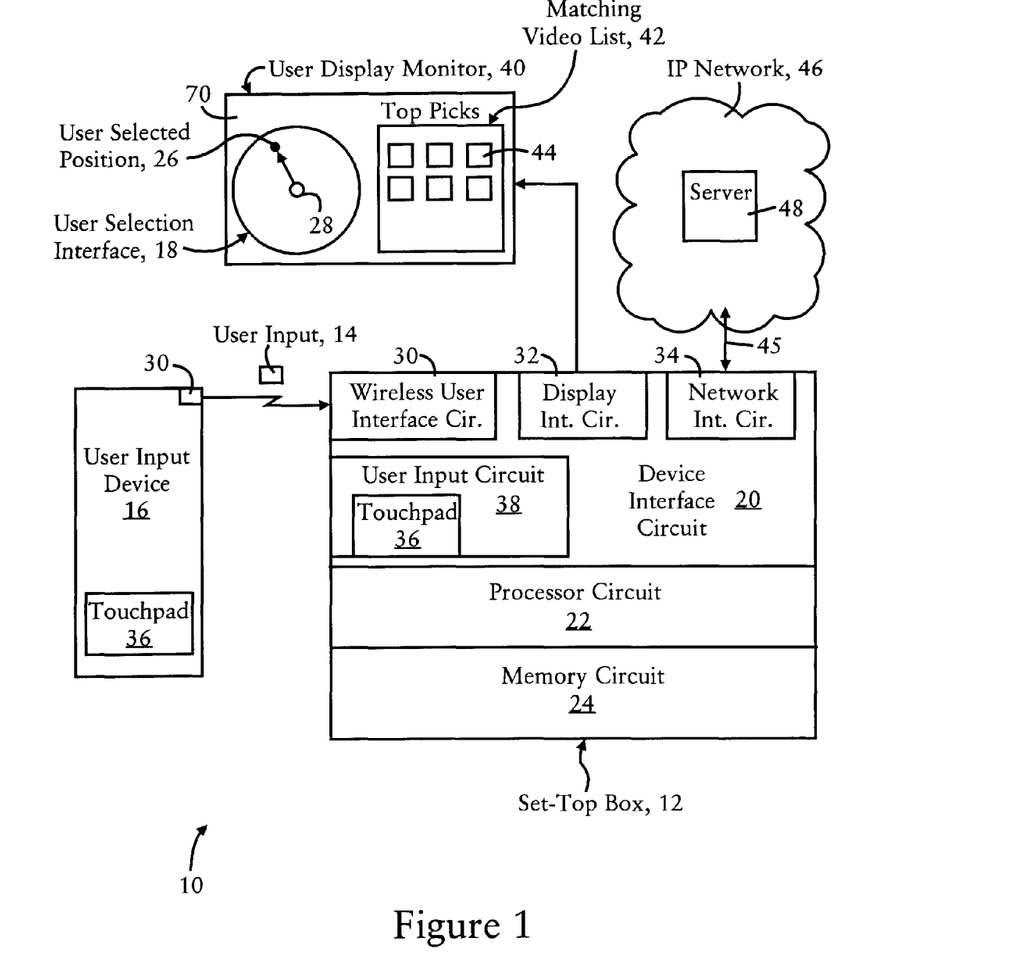
FIG. 1 illustrates an example system having an apparatus configured for generating and displaying a user selection interface representing multiple content selection vectors mapped to distinct media attributes of recommended video content elements, according to an example embodiment.

FIG. 1 is a diagram illustrating an example system 10 having a menu generation apparatus 12 configured for receiving a user input 14 from a user input device 16, and generating and outputting a user selection interface 18, according to an example embodiment. The menu generation apparatus 12, implemented for example as a set-top box or a Internet Protocol (IP) based router implemented at a customer premises, can include a device interface circuit 20, a processor circuit 22, and a memory circuit 24. As described in further detail below, the menu generation apparatus 12 can be configured for outputting updated user selection interfaces in response to each corresponding user input 14, based on identifying a selected position 26 within the user selection interface 18 relative to an origin 28 centered at the user selection interface 18. In particular, the user-selected position 26 is identified by the menu generation apparatus 12 as extending from the origin 28 and toward one or more content selection vectors mapped to distinct media attributes.

The device interface circuit 20 can include a wireless user interface circuit 30, a display interface circuit 32, and a network interface circuit 34. The wireless user interface circuit 30 is configured for receiving the user input 14 via a wireless transmission link, for example an infrared or radiofrequency (RF) transmission link. The user input device 16 can include a corresponding wireless interface circuit 30, and user input circuitry 36 that enables the user to provide a user input 14 that reflects the selected position 26 within the user selection interface 18. For example, the user input circuitry 36 can be implemented as a touch pad sensor circuit, or as a joystick, etc. The device interface circuit 20 also can include a user input circuit 38 that includes its own user input circuitry 36, eliminating the necessity of a separate user input device 16.

The display interface circuit 32 is configured for outputting information to a user display monitor 40, for example analog or digital video signals, enabling the user display monitor 40 to generate a display 70. The display 70 includes a user selection interface 18 and a matching video list 42 that includes one or more identifiers 44 for respective video content elements that are identified by the menu generation apparatus 12 as having the highest relative correlation (among available video content elements) with the origin 28 of the user selection interface 18.

The network interface circuit 34, implemented for example as an Ethernet or 100 BaseT network transceiver circuit, a Digital Subscriber Line (DSL) modem circuit, or a cable modem circuit, can be configured for establishing an Internet protocol (IP) based link 45 with an IP based network 46. Hence, the network interface circuit 34 enables the processor circuit 22 to send and receive information to or from one or more servers 48 within the IP based network 46.

As described in further detail below, the processor circuit 22 can be configured for updating the user selection interface 18 displayed by the user display monitor 40 in response to each successive user input 14 representing a corresponding selected position 26 on the user selection interface 18. Although the user may view a relatively simple user selection interface 18, the user selection interface 18 by virtue of its coordinate system (e.g., x-y, polar) represents the collection of content selection vectors 80, illustrated in FIGS. 3A and 3B, that extend from the origin 28 and represent distinct media attributes for at least one prescribed attribute type. Hence, the user selection interface 18 provides multidimensional navigation that enables the menu structure to be dynamically organized in a manner that is customizable for the user based on the user preferences.

Figure 2A:
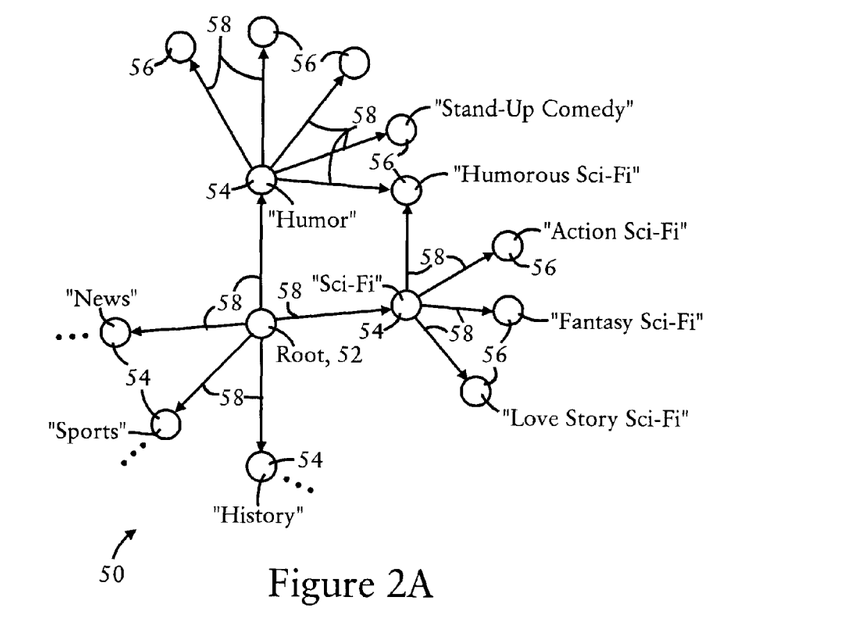
FIGS. 2A and 2B illustrate example methods for the apparatus of FIG. 1 to select an updated user selection interface, according to an example embodiment.
Figure 2B:
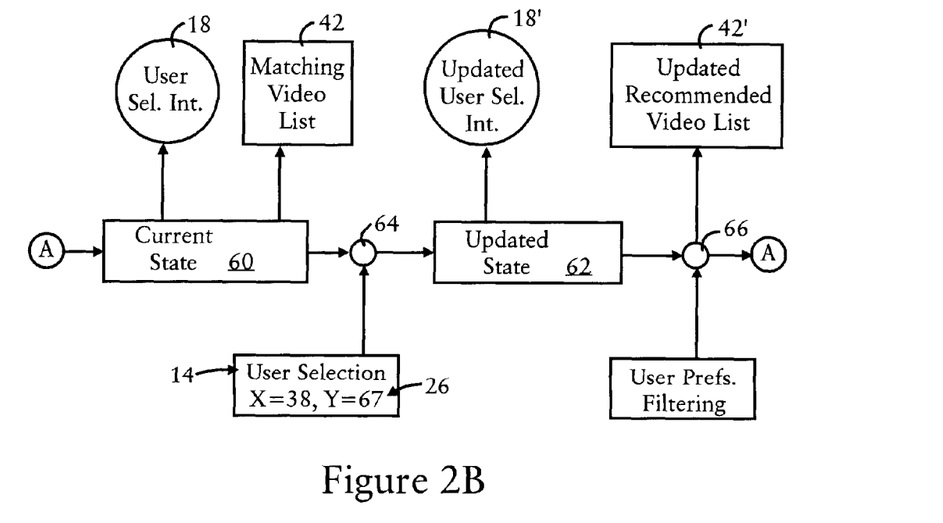

FIGS. 2A and 2B illustrate alternative methods that can be executed by the processor circuit 22 of generating an updated user selection interface based on selecting updated content selection vectors that have a determined relation to at least one content selection vector that is in proximity to a selected position 26 within the user selection interface 18. As illustrated in FIG. 2A, the processor circuit 22 can implement a multidimensional menu tree 50 having a root node 52, primary nodes 54 that have a link 58 to the root node 52, and secondary nodes 56 that have a link 58 to at least one primary node 54. Although not illustrated in FIG. 2A, the menu tree 50 can include additional nodes, for example tertiary (i.e., third order) nodes that have a link 58 to at least one secondary node 56, etc. In addition, the menu tree can include nodes that have links 58 to more than one node, such that the path between two nodes within the tree 50 can resemble a directed acyclic graph having multiple paths.

The processor circuit 22 can utilize the tree 50 illustrated in FIG. 2A in order to identify the next node that should serve as the context for the updated user selection interface based on the position 26 of the user input relative to the current user selection interface 18 display to the user, based on the mapping between the user selection interface 18 and the menu tree 22, and/or based on user selection preferences. For example, the processor circuit 22 can determine from the selected position 26 input by the user relative to the root user selection interface 18a, illustrated in FIG. 3A, that the updated user selection interface should be based on the "Action Sci-Fi" node 56 based on a combination of the selected position 26 of the user input plus known user preferences for the identified user indicating that the user prefers action oriented content. Hence, the links 58 within the tree 50 can represent the content selection vectors that enable traversal from one node to another node within the tree 50 based on the corresponding media attribute chosen by the user (which can be illustrated by measuring the user selected position as a vector having a vector angle), and the extent to which the media attribute is desired by the user (which can be illustrated as the corresponding "length" of the vector).

FIG. 2B illustrates an alternative example by the processor circuit 22 selecting an updated user selection interface 18', according to an example embodiment. The processor circuit 22 can be configured for dynamically generating an updated user selection interface 18 representing an updated menu state 62 based on comparing in step 64 the user selection input 14 specifying the corresponding selected position 26 (illustrated for example using an x-y coordinate system) with the current menu state 60. The current menu state 60 can be identified by the processor circuit 22 by a menu identifier stored in the memory circuit 24, or dynamically identified based on storing in the memory circuit 24 a list of content selection vectors that are currently in use for generation and display of the corresponding user selection interface 18. Hence, the processor circuit 22 can dynamically calculate in step 64 an updated state 62 based on dynamically adjusting the content selection vectors within the current menu state 60 in order to generate for the updated menu state 62 a set of updated content selection vectors: the updated content selection vectors can be represented by the updated user selection interface 18'. The updated menu state 62 also can be used in combination with user preferences filtering 64 in order to generate in step 66 an updated list 42 of the video recommendations that can be concurrently displayed on the monitor 40 with the updated user selection interface 18'.

Any of the disclosed circuits of the menu generation apparatus 12 (including the device interface circuit 20, the processor circuit 22, the memory circuit 24, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 28) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 24 can be implemented, for example, using a nonvolatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the processor circuit 22, for example based on memory address assignment and partitioning executed by the processor circuit 22.

Figure 3A:
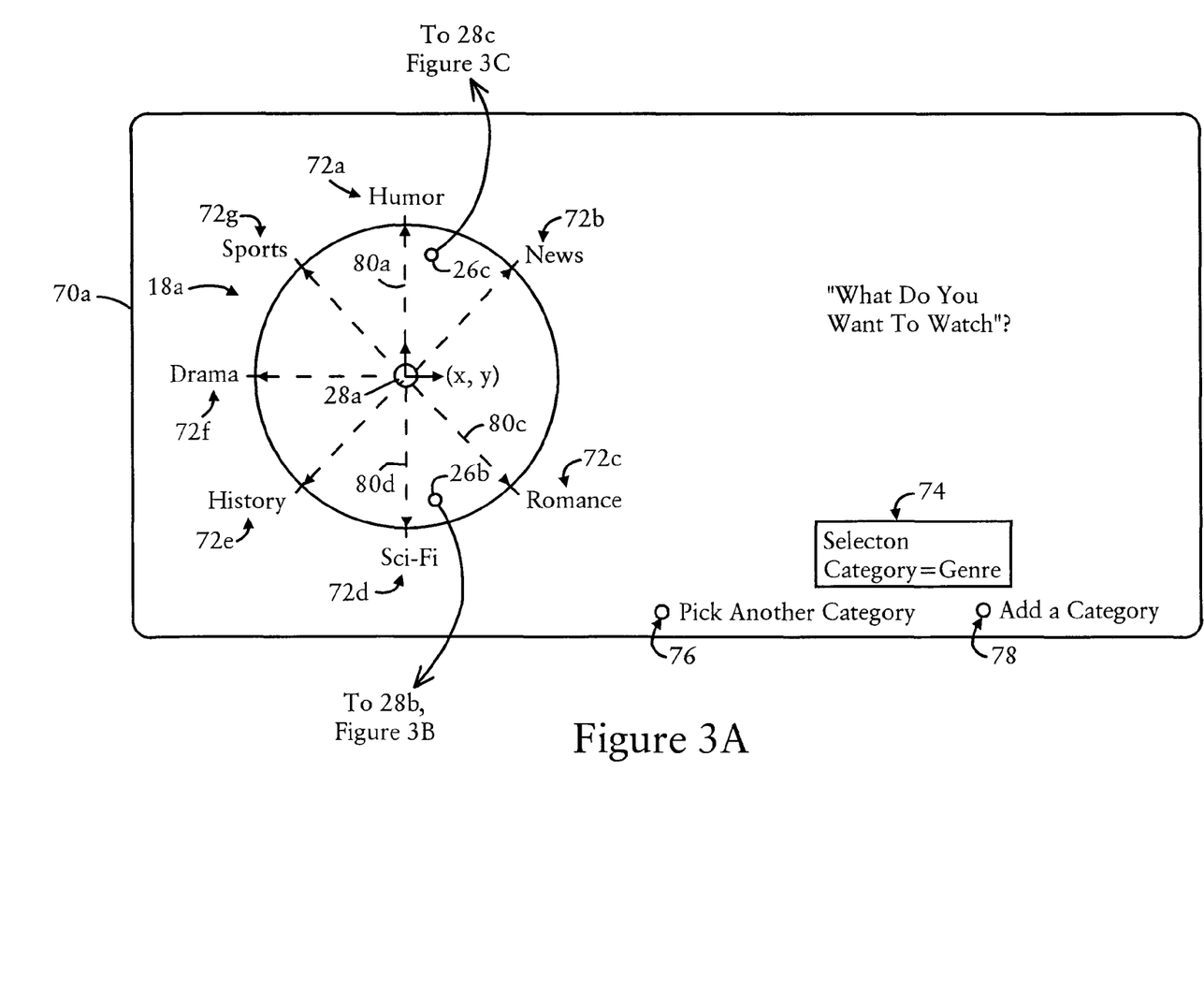
FIGS. 3A, 3B, and 3C illustrate example user selection interfaces generated for display to a user, according to an example embodiment.
Figure 3B:
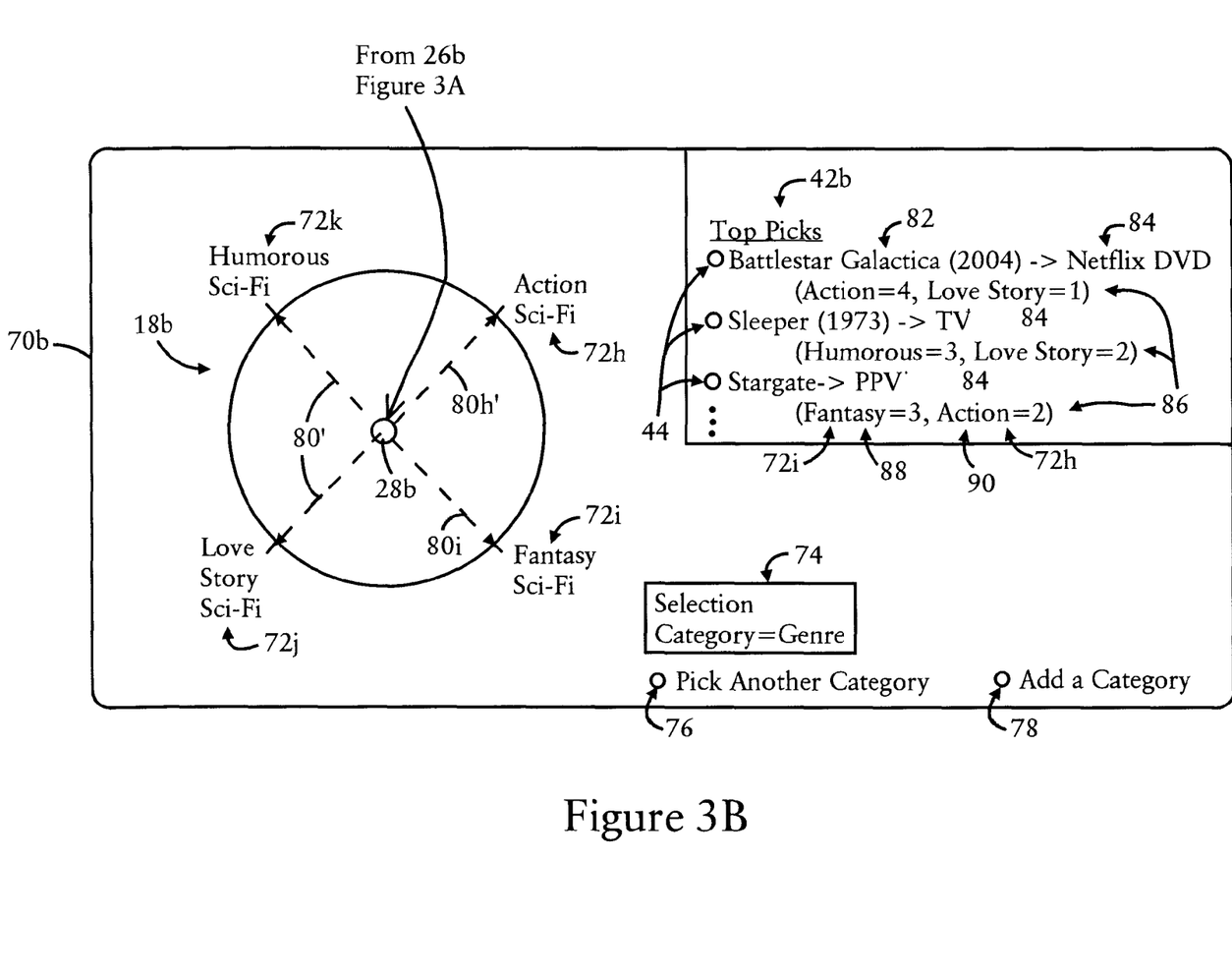
Figure 3C:
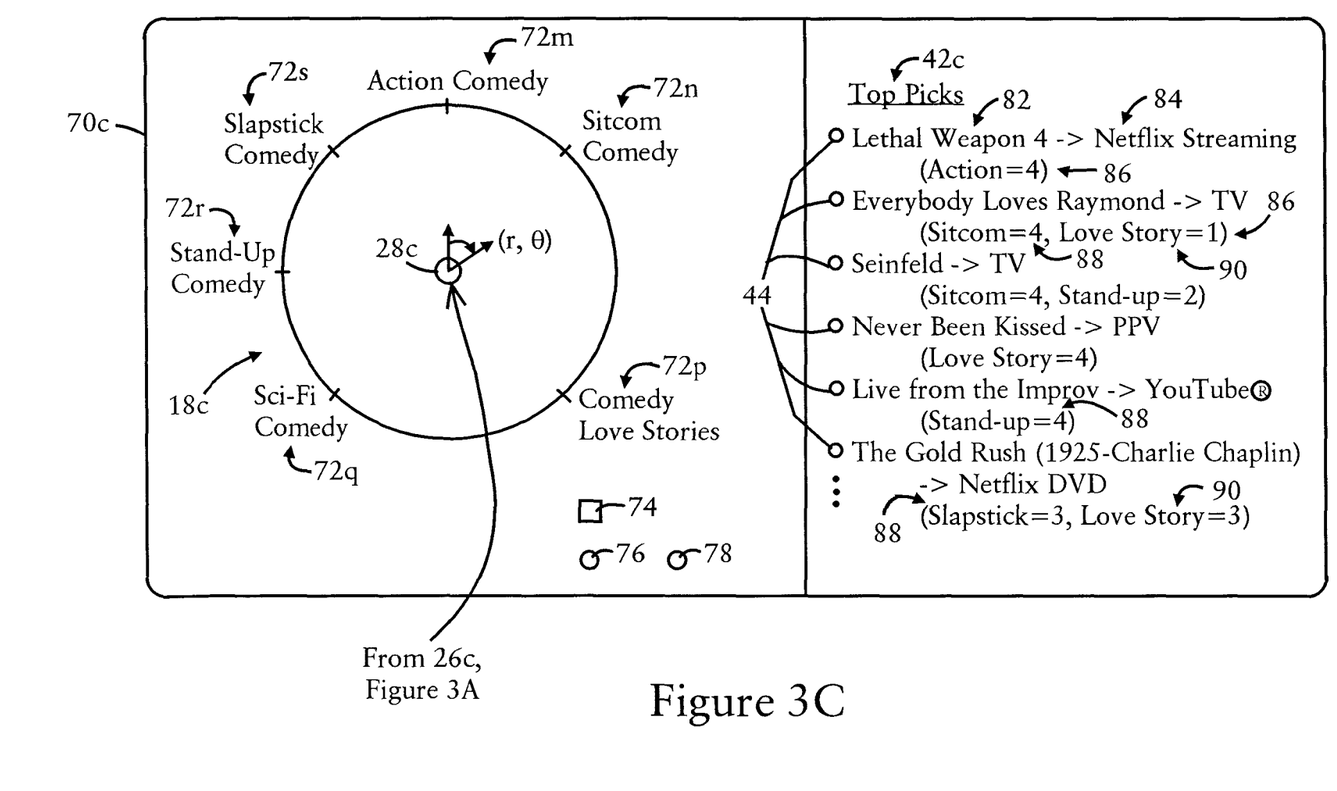

FIGS. 3B and 3C illustrate respective example updated user selection interfaces 18b and 18c that can be generated by the processor circuit 22, according to an example embodiment. The updated user selection interfaces 18b or 18c can be generated in response to user inputs at respective selected positions 26b or 26c within a currently displayed user selection interface 18a illustrated in FIG. 3A. For example, the user selection interface 18a that is first presented to the user in the display 70a can represent the root menu position 52 of FIG. 2A, where the user selection interface 18a has two dimensions (e.g., x, y) of a prescribed coordinate system. The root user selection interface 18a that is displayed to the user is centered at an origin 28a and illustrates distinct media attributes 72 for a prescribed attribute type (e.g., "Selection Category=Genre") 74. Although the root user selection interface 18a illustrates multiple media attributes 72a, 72b, 72c, 72d, 72e, 72f, and 72g for the single prescribed attribute type 74 of "genre", the processor circuit 22 can offer to the user within the display 70a a selection option 76 to choose another attribute type, and/or a selection option 78 to add another attribute type to the user selection interface 18a.

Each user selection interface 18 represents a plurality of content selection vectors 80 that extend from the corresponding origin 28 and map to respectively distinct media attributes 72. The representation of the content selection vectors 80 by the user selection interface 18 is illustrated with respect to the user selection interfaces 18a and 18b as an illustration of the logical relationships maintained by the processor circuit 22 between the user selection interface 18 and the corresponding set of content selection vectors 80. The actual user selection interface that is displayed to the user is more accurately illustrated with respect to the user selection interface 18c and the user selection interface 18d of FIG. 4, where only the media attributes 72 need to be illustrated at the periphery of the user selection interface; in this regard, the content selection vectors 80 and the origin 28 need not be displayed to the user. Although the user selection interface 18d is illustrated in black-and-white, any user selection interface 18 also can be implemented as a spectrum of colors distributed throughout the user selection interface 18, where different media attributes 72 are assigned distinct colors, resulting in a color circle having smoothly transitioning colors based on combination of primary and secondary colors that vary based on the angle within the circle and the distance from the origin 28.

As illustrated in FIG. 3A, assuming the user submits a user input that corresponds to the selected position 26b within the user selection interface 18a, the processor circuit 22 can interpret that the selected position 26b identifies that the user input extends from the origin 28a toward at least one content selection vector 80 that is identified by the processor circuit 22 as represented within the user selection interface 18a. As illustrated in FIG. 3A, the selected position 26b extends toward the content selection vector 80c that is mapped to the media attribute "romance" 72c; the selected position 26b also extends toward the content selection vector 80d that is mapped to the media attribute "Sci-Fi" 80d. The processor circuit 22 can determine that the selected position 26b extends closer toward the content selection vector 80d than the content selection vector 80c, and therefore determine that the user prefers to see mostly science fiction related video content elements, possibly combined with science fiction related video content elements that also contain romance subplots.

Hence, the processor circuit 22 can generate and display to the user an updated user selection interface 18b within a display 70b, illustrated in FIG. 3B. The updated user selection interface 18b has a corresponding updated origin 28b that corresponds to the selected position 26b from the prior user selection interface 18a of FIG. 3A. As illustrated in FIG. 3B, the updated user selection interface 18b represents updated content selection vectors 80' that have a determined relation to the closest content selection vector 80d relative to the selected position 26b. The updated content selection vectors 80' also map to respectively distinct media attributes 72h, 72i, 72j, and 72k that have a determined relation to the closest content selection vector 80d relative to the prior selected position 26b.

The processor circuit 22 also can generate and display to the user an updated matching list 42b of recommended video content elements that have the highest relative correlation with the content selection vector 80d relative to the selected position 26b. In other words, the processor circuit 22 can identify a relative "influence" of the vector 80d in the user selection based on the distance between the vector 80d and the selected position 26b, relative to any adjacent vector 80c. Hence, the processor circuit 22 can implement known correlation techniques to identify one or more video content elements having the highest correlation to the content selection vector 80d relative to the selected position 26b.

As illustrated in FIG. 3B, the list 42b of recommended video content elements can include one or more identifiers 44 that uniquely identifies the corresponding video content element that is available for the user. Each identifier 44 can include a title indicator 82, a media source identifier 84 that can identify a source of the corresponding video content element from among multiple video sources (e.g., Television (TV), at the service YouTube at the website address "www.youtube.com", Netflix DVD rental, Netflix streaming video, or Pay-Per-View (PPV). The processor circuit 22 also can add within any one of the identifiers 44 a media attribute indicator 86 that identifies the relative position of the corresponding video content element within the updated user selection interface 18b. For example, any one media attribute indicator 86 can include a first vector correlation indicator 88 that indicates the correlation between the media attribute (e.g., 72i) of a corresponding video content element (e.g., the video content element "Stargate" in the list 42b) with a corresponding updated content selection vector 80' (e.g., 80i'). Any one media attribute indicator 86 also can include a second vector correlation indicator 90 that indicates the correlation between a second media attribute (e.g., 72h) of the corresponding video content element (e.g., the video content element "Stargate" in the list 42b) with a second updated content selection vector (e.g., 80h'). It will become readily apparent that the numerical values used to illustrate the vector correlation indicators 88 and 90 can be replaced with where the number of bars of a given color can represent the corresponding correlation for the media attribute 72 having the matching color.

Referring to the user selection interface 18a of FIG. 3A, if the processor circuit 22 detects that the user submits a user input that corresponds to the selected position 26c within the user selection interface 18a, the processor circuit 22 can interpret that the selected position 26c of the user input 14 extends from the origin 28a toward the content selection vector 80a that is mapped to the media attribute "humor" 72a, and that the adjacent content selection vector 80b that is mapped to the media attribute "news" 72b can be chosen with respect to parodies of current events. In response, the processor circuit 22 can determine that the user prefers to see mostly comedy related video content elements, and therefore can generate and display to the user an updated user selection interface 18c within the display 70c, illustrated in FIG. 3C. The updated user selection interface 18c has a corresponding updated origin 28c that corresponds to the selected position 26c from the prior user selection interface 18a of FIG. 3A. Although not illustrated in FIG. 3C, the updated user selection interface 18c represents updated content selection vectors that have a determined relation to the closest content selection vector 80a relative to the selected position 26c, and which map respectively to the distinct media attributes 72m, 72n, 72p, 72q, 72r, and 72s. The processor circuit 22 also can generate and display to the user an updated matching list 42c of recommended video content elements that include one or more identifiers 44. As described previously, each identifier 44 can include a title indicator 82, a media source identifier 84, and a media attribute indicator 86 including one or more vector correlation indicators 88, 90. As described previously, if the updated user selection interface 18c is implemented using a color based interface (e.g., a color wheel), the numeric values illustrated for the vector correlation indicators 88 and 90 can be replaced with color bars that match the colors assigned to the respective media attributes 72.

Figure 4:
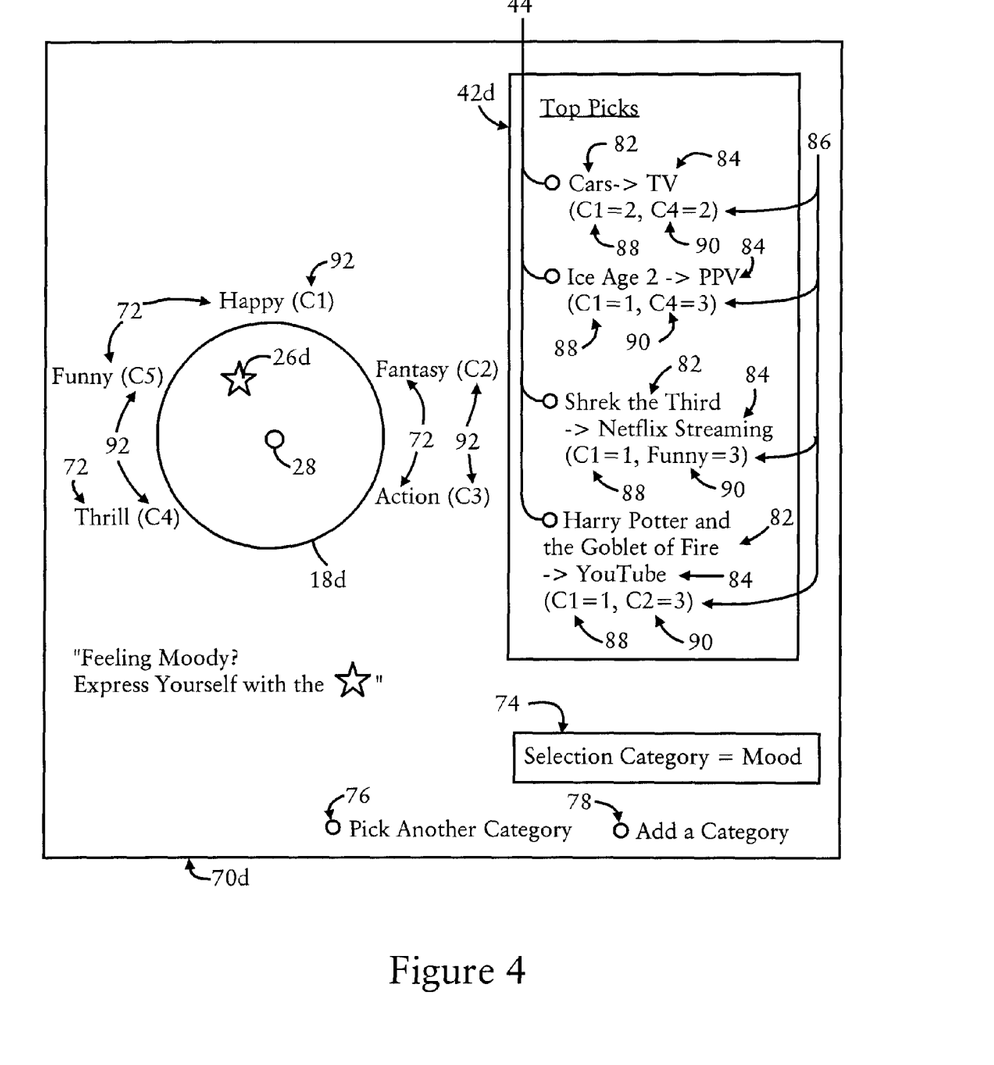
FIG. 4 illustrates another example user selection interface and a corresponding matching video list, according to another example embodiment.

FIG. 4 illustrates another example display 70d that can be generated by the processor circuit 22 for display by the user display monitor 40. The example display 70d can include a user selection interface 18d and a matching video list of 42d that are based media attributes 72 that belong to a "user mood-based" attribute type 74, according to an example embodiment. As illustrated in FIG. 4, the example media attributes 72 according to the "user mood" attribute type 74 are correlated to respective user moods, namely different emotional moods that a user may be experiencing while navigation. Example media attributes 72 within the prescribed attribute type of "mood" 74 can include a "happy" media attribute, a "fantasy" media attribute, an "action" attribute media attribute, a "thrill" media attribute, and/or a "funny" media attribute. Hence, depending on the current mood of a user, the user can generate an input that identifies a selected position 26d on the user selection interface 18d that represents the mood of the user (or the mood that the user wishes to attain). In response, the processor circuit 22 can generate an updated user selection interface having an updated origin and representing updated content selection vectors that are mapped to updated media attributes displayed within the updated user selection interface. The processor circuit also can generate for concurrent display the matching video list 42d that identifies video content elements having the highest correlation with respect to the user selection and the current state of the user selection interface 18.

As illustrated in FIG. 4, each displayed media attribute 72 includes a color indicator 92 that represents a prescribed color that is assigned to the corresponding media attribute 72. For example, the color indicators C1, C2, C3, C4, and C5 can represent respectively the colors red, yellow, green, blue, purple that are displayed within the spectrum of the user selection interface 18. Hence, the media attribute indicator 86 containing the vector correlation indicators 88 and 90 for the video content element entitled "Harry Potter and the Goblet of Fire" (illustrated as "C1=1, C2=3") can be implemented by displaying one red-colored bar adjacent to three yellow-colored bars. Hence, the combination of different color-coded bars provides users a more visually appealing display of the vector correlation indicators 88 and 90 of the media attribute indicator 86. Hence, the media attribute indicator is 86 can identify the relative positions of the respective video content elements within the user selection interface 18, using either a numerical representation or a color-based representation.

Figure 6:
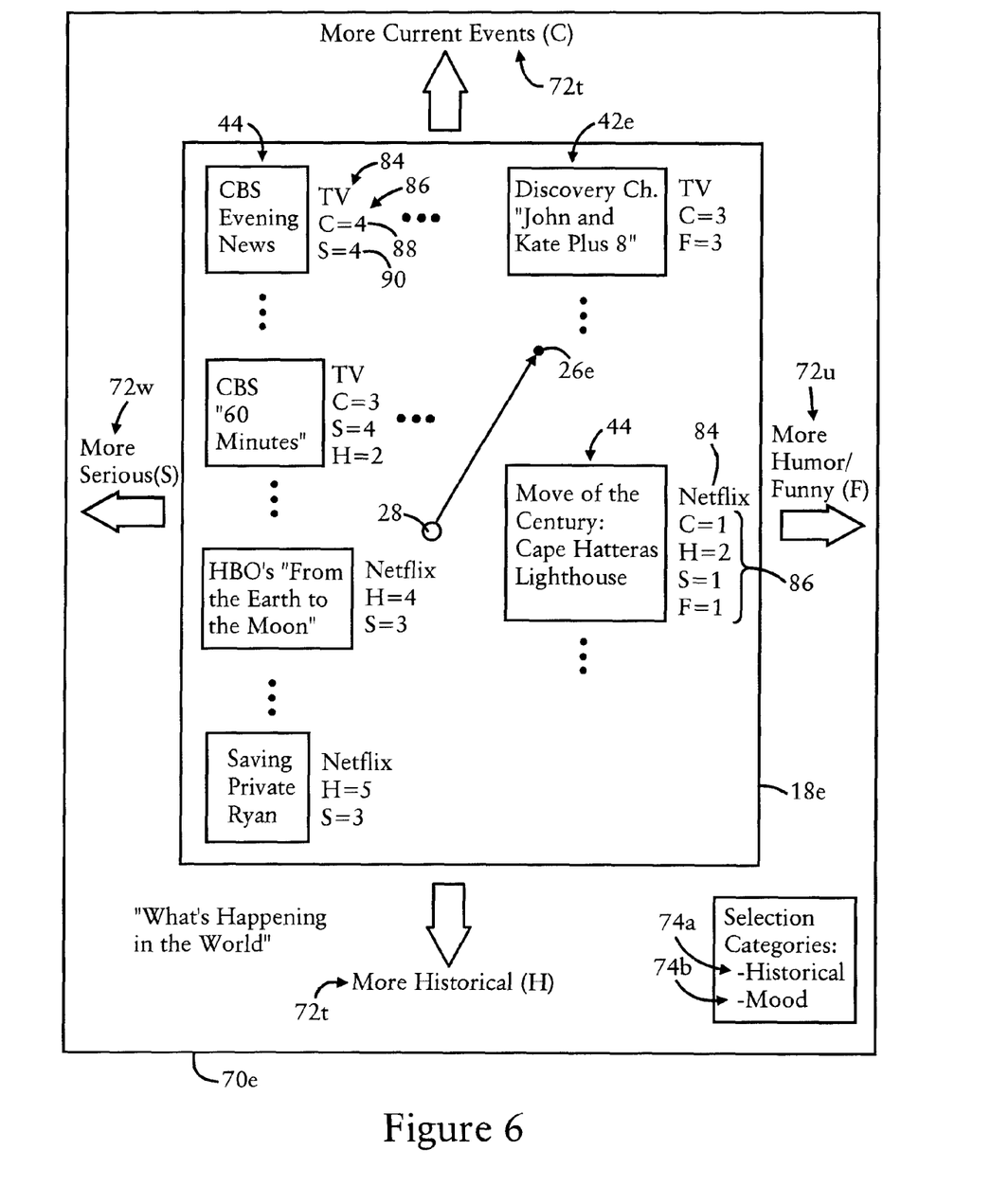
FIG. 6 illustrates another example user selection interface generated by the apparatus of FIG. 1, according to another example embodiment.

FIG. 6 illustrates another example display 70e that can be generated by the processor circuit 22, where the matching video list 42 can be implemented within the user selection interface 18e. Hence, the processor circuit 22 can generate an updated user selection interface that displays different media attributes 72 in response to detecting a user-selected position 26e within the user selection interface 18e. The processor circuit 22 also can update the matching video list 42 in response to the user-selected position. If the user-selected position 26 is the same as the origin, the processor circuit 22 can be configured for interpreting the user input as a "zoom in" (or "zoom out") function for more detailed (or less detailed) information around the origin 28, and update the user selection interface 18e and the matching video list 42 accordingly.

Hence, the processor circuit 22 enables a user to utilize multidimensional navigation to more precisely locate the type of video content elements that are desired to be viewed by the user.

Figure 5:
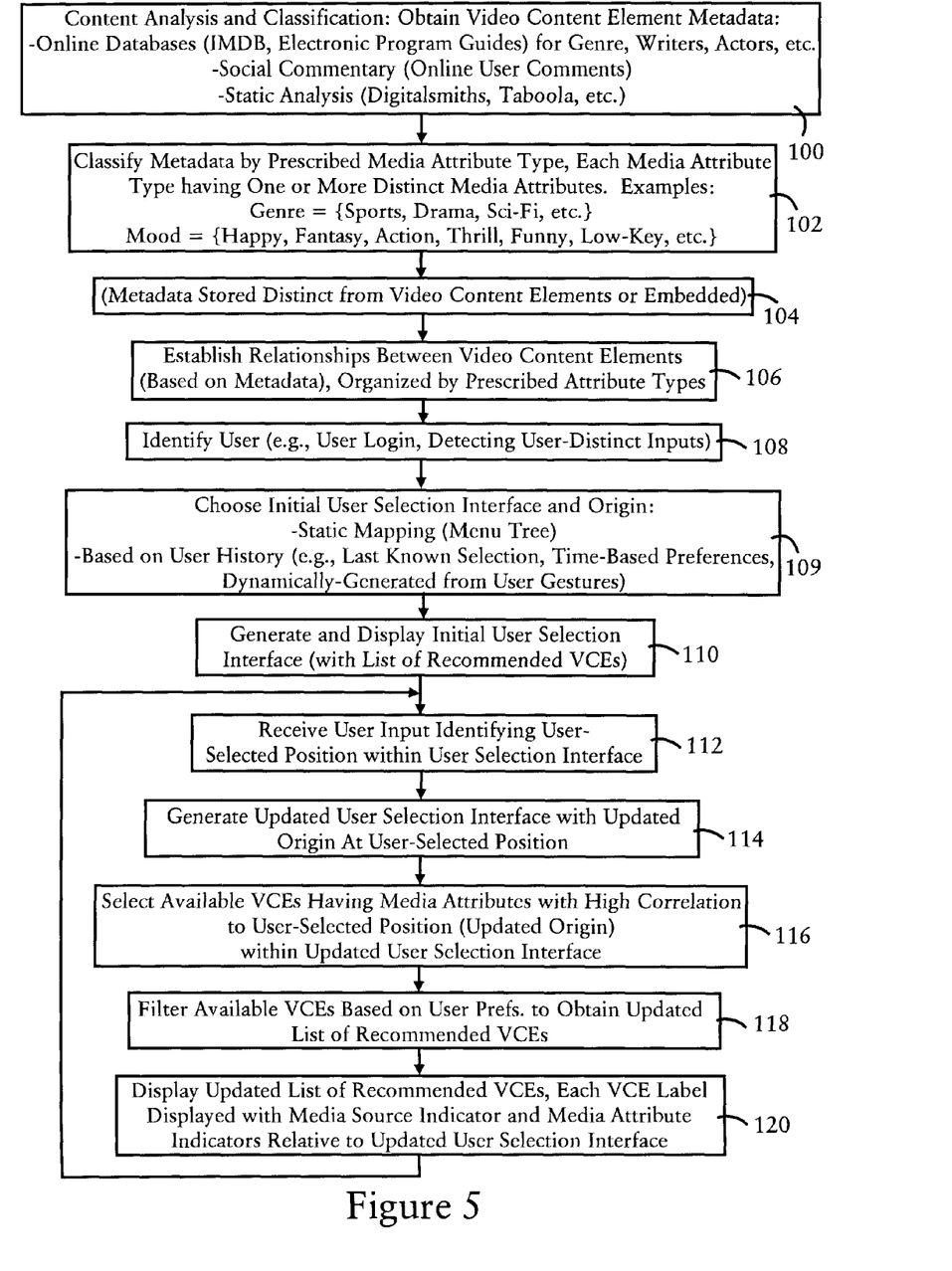
FIG. 5 illustrates an example method by the apparatus of FIG. 1 of generating and displaying user selection interfaces and matching video lists, according to an example embodiment.

FIG. 5 illustrates generation and display by the menu generation apparatus 12 of the user menu display 70 containing the user selection interface 18 and a matching video list 42 of recommended video content elements (VCEs), according to an example embodiment. The steps described in FIG. 5 can be implemented as executable code stored on a computer readable medium (e.g., floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

Prior to the generation and display of the user selection interface 18, the relationships between the content selection vectors based on the media attributes is established based on content analysis and classification in step 100. The content analysis and classification, which can be performed either by the processor circuit 22 or within a network-based server 48 within the IP based network 46, can obtain metadata about each video content element (VCE) that is to be recommended to a user. The metadata that describes any video content element can be obtained from various sources, including online databases (e.g., the Internet Movie Database at the website address "www.imdb.com") or online electronic program guides that are provided by service providers, fan sites, etc. (e.g., the TitanTV website service at the website address "www.titantv.com"). The metadata that describes a given video content element also can be obtained based on the processor circuit 22 and/or a server 48 within the network 46 obtaining social commentary, for example online user comments from social commentary websites or fan pages.

Hence, numerous forms of data can be used to characterize a given video content element, including existing database entries and the accumulation and analysis of user inputs as users are consuming the video content element. In addition, user inputs via different user input devices can be accumulated and analyzed, for identification of "socially relevant gestures" by the users that can be used to characterize content consumed by users, or to identify different users that share similar interests. An example of accumulating user inputs in order to identify socially relevant gestures identifying user interests is described in the commonly assigned, copending U.S. patent application Ser. No. 11/947,298, filed Nov. 29, 2007, entitled "Socially Collaborative Filtering". An example of identifying different users that share similar interests from socially relevant gestures is described in the commonly assigned, copending U.S. patent application Ser. No. 12/110,224, filed Apr. 25, 2008, entitled "Identifying User Relationships from Situational Analysis of User Comments Made on Media Content". The identification of different users that share similar interests based on consuming similar video content elements can be used to establish different classes of users, or "cohorts", enabling a prescribed attribute type to be a user class (or cohort identification), with example media attributes being videos enjoyed by a certain group of individuals (e.g., sports fans, gardening enthusiasts, opera fans, NASCAR fans, healthcare professionals, political groups, etc.).

Another classification and analysis technique that can be applied by the processor circuit 22 or the server 48 in step 100 can include performing static analysis of a video content element, as offered commercially by Digitalsmiths (available at the website address "digitalsmiths.com") or Taboola (available at the website address "taboola.com").

The metadata of the video content elements obtained in step 100 can be classified by either the processor circuit 22 and/or the server 48 in step 102 by prescribed media attribute types 74 (e.g., genre, age category, MPAA rating, actors, duration, release date, user ratings, parental guide ratings, language, mood, user group or cohort, etc.). Once the prescribed media attribute types 74 have been defined, the distinct media attributes 72 that are within the set of a given media attribute type can be defined. As illustrated in step 102, example media attributes 72 within the classification of the media attribute type of "genre" can include sports, drama, science fiction, etc.; example media attributes 72 within the classification of the media attribute type of "mood" 74 can include happy, fantasy, action, thrill, funny, low-key, etc. Metadata that already has been structured may require minimal classification effort, identifying established metadata structures and metadata definitions, and assigning or mapping the established metadata structures and definitions to prescribed media attribute types 74 and to specific media attributes 72. Unstructured metadata such as user commentary also can be analyzed and classified by the processor circuit 22 and/or the server 48 for classification of media attributes 72 within prescribed attribute types 74.

The processor 22 and/or the server 48 stores in step 104 the metadata in a tangible computer-readable memory medium, for example within a memory circuit 24 or a hard disk. The server 48 also can store the metadata in a database reachable via the IP network 46. Hence, the processor circuit 22 can be configured for retrieving the metadata from remote locations via the IP network 46, for example based on sending a request to the server 48, or sending a database query to a database in the IP network 46. The metadata for a given video content element can be stored on a computer readable tangible medium as a data structure that is distinct from the video content element; alternately, the metadata for a given video content element can be embedded within the video content element.

Once the set of media attributes 72 for a given video content element have been established according to their respective media attribute types 74 based on the classification of the metadata for the video content elements, the processor circuit 22 and/or the server 48 can establish in step 106 relationships between video content elements based on the correlation of the respective media attributes within a prescribed attribute type. As apparent from the foregoing, the video content elements can have established relationships with other video content elements based on multidimensional vectors that enable correlation relative to a given media attribute value 72, a given attribute type 74, or a combination thereof. Consequently, the processor circuit 22 and/or the server 48 can determine the relative "positions" of different video content elements within an N-dimensional relationship matrix, wherein the relationship matrix can include a relationship vector for each video content element, each media attribute value 72, and each media attribute type 74.

Hence, the collection of content selection vectors 80 that are represented within a given user selection interface 18 can represent the projection of selected relationship vectors of the N-dimensional matrix after applying a set of filter parameters by the processor circuit 22. As described in further detail below, the filter parameters applied by the processor circuit 22 can be chosen based on user state within the user selection interface, user history, user identity, known or determined user preferences, etc.

As described previously, any of the steps 100, 102, 104, and 106 can be executed by the processor circuit 22 within the user menu generation apparatus 12, by the server 48, or by multiple distributed servers that can be reachable via the IP network 46. Assuming that at least some of the information is generated outside of the menu generation apparatus 12, the processor circuit 22 can be configured for receiving the information from the server 48, for example during downloading of a viewing guide during initialization of the user menu generation apparatus 12, in response to user requests, or in response to periodic push-poll updates, etc.

The multidimensional user navigation will be described starting with step 108. The processor circuit 22 can be configured for identifying the user in step 108, for example based on user login, or based on dynamically identifying the user based on prescribed user actions, biometric analysis, etc. The "identification" of a user does not necessarily require identifying a user's identity, but can be simply any technique for distinguishing the user from other users that might access the user generation apparatus 12. User identification (e.g., identifying an alias used for a given user) can be useful in dynamically determining a mood of a user at given times of the day. User identification also can include an anonymous user.

The processor circuit 22 chooses in step 109 an initial user selection interface 18 and a corresponding origin 28, for example based on static mapping using the menu tree 50 illustrated in FIG. 2A, or based on user history using the illustrated selection technique and FIG. 2B. For example, the processor circuit 22 can choose in step 109 the user selection interface 18 and the corresponding origin 28 based on a random selection, last known position that was viewed by the user, time-based preferences (e.g., a prescribed position at a given time of day), or based on a dynamic selection from determining user preferences as illustrated in the above-identified copending U.S. patent application Ser. No. 11/947,298, entitled "Socially Collaborative Filtering".

The processor circuit 22 generates in step 110 the initial user selection interface 18 having the corresponding origin 28 and representing a plurality of content selection vectors 80 that are mapped to respectively distinct media attributes 72 that are displayed with the user selection interface 18.

The wireless user interface circuit 30 and/or the user input circuit 38 of the user menu generation apparatus 12 can receive in step 112 a user input that identifies the user-selected position 26 within the user selection interface. As described previously, the user-selected position 26 input by the user is interpreted by the processor circuit 22 as extending from the origin 28 of the user selection interface 18 currently displayed to the user toward one or more content selection vectors 80.

The processor circuit 22 generates in step 114 an updated user selection interface 18 having a corresponding updated origin 28 at the user-selected position, for example as illustrated in FIG. 3B or FIG. 3C. The processor circuit 22 outputs the updated user selection interface for display to the user via the display interface circuit 32.

The processor circuit 22 also selects in step 116 the available video content elements having media attributes with sufficiently substantial correlation to the user selected position within the updated user selection interface. For example, the processor circuit 22 can identify the video content elements having a media attributes 72 that have a substantially close correlation or a match with the selected position and the updated content selection vectors represented by the updated user selection interface. As illustrated in FIG. 3A, the user-selected position 26b from the user selection interface 18a may be interpreted by the processor circuit 22 as a request for content having a substantially high value for science fiction, with a possible preference for a romance or love story attribute; in this example, the processor circuit 22 may select video content elements having the highest relative correlation with respect to the content selection vector ("Sci-Fi" 80d), and which can have a correlation with respect to a second content selection vector ("Romance" or "Love Story" 80c). Hence, the processor circuit 22 may determine with respect to FIG. 3B that the list 42b identifies the filtered video content elements having the highest relative correlation with respect to the content selection vector ("Sci-Fi" 80d), and which can have a correlation with respect to a second content selection vector ("Romance" or "Love Story" 80c), based on the weighting provided by the selected position 26b. The list 42b also can be implemented as a scrollable ordered list, where the video content elements are ordered starting with those having the highest correlation to the selected position 26b, decreasing to a prescribed correlation limit (e.g., a media attribute value 88 or 90 must have at least a 50% correlation to the closest content selection vector 80d).

The processor circuit 22 filters in step 118 the available audio content elements based on user preferences to obtain the list of recommended video content elements 42. The processor circuit 22 outputs in step 120 the list of recommended video content elements 42, for display by the user display monitor 40 of the updated list 42 that can include for any one of the video content elements a corresponding label 44 that is displayed with a media source indicator 84 and media attribute indicators 86 identifying the relative position of the video content element within the updated user selection interface. Hence, each recommended video content element in the list 42 includes vector correlation indicators 88, 90 indicating that the corresponding recommended video content element has at least a substantial correlation based on its relative position within the updated user selection interface relative to the updated origin.

Step 112 and the subsequent steps can be repeated by the processor circuit 22 for each user input 14 received by the menu generation apparatus 12. In addition, if the processor circuit 22 determines another user is using the input device 16, the processor circuit 22 can repeat steps 108, 109, 110, 112, and the remaining steps for the new user.

According to the example embodiments, multidimensional navigation can be offered to the user to provide a more effective and efficient navigation of video content elements, where content selection vectors can be selection for generation of multidimensional user selection interfaces and at least one identifier for a video content element having a highest correlation with a content selection vector. Hence, users can enjoy more efficient user navigation based on the relationships between media attributes that are used to identify and classify video content elements. The disclosed user selection interface also can be implemented in three dimensions (3D), for example using holographic or other 3D displays.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
generating and displaying, to a user, a user selection interface having an origin, the user selection interface enabling simultaneous multidimensional navigation toward one or more video content elements based on representing a plurality of content selection vectors extending from the origin and mapped to respectively distinct media attributes within a prescribed attribute type;
detecting a user input that extends from the origin toward at least one of the content selection vectors and that identifies a selected position within the user selection interface as a user selection having a determined relative correlation toward the corresponding distinct media attribute of the at least one content selection vector;
generating and displaying to the user an updated user selection interface in response to the user input, the updated user selection interface having a corresponding updated origin at the selected position and representing a plurality of updated content selection vectors having a determined relative correlation to the at least one content selection vector; and
selecting and displaying to the user, concurrent with the displaying of the updated user selection interface, at least one identifier for a corresponding video content element having the corresponding media attribute having a highest correlation with the at least one content selection vector relative to the selected position from the origin.

2. The method of claim 1, wherein the at least one identifier includes a media attribute indicator identifying a relative position of the corresponding video content element within the updated user selection interface, based on the corresponding media attribute.

3. The method of claim 2, wherein the at least one identifier further includes a media source identifier identifying a source of the corresponding video content element from among multiple video sources.

4. The method of claim 2, wherein the media attribute indicator identifies the relative position based on displaying a first vector correlation indicator indicating a corresponding correlation of the media attribute of the corresponding video content element to at least one of the updated content selection vectors.

5. The method of claim 4, wherein:
the user selection interface has two dimensions and is centered at the origin;
the media attribute indicator further identifies the relative position based on displaying, concurrently with the first vector correlation indicator, a second vector correlation indicator indicating the corresponding correlation of a second media attribute of the video content element to a second one of the updated content selection vectors.

6. The method of claim 1, further comprising selecting the origin based on identifying the user, and determining a user selection preference of the user relative to the prescribed attribute type.

7. The method of claim 6, further comprising selecting the content selection vectors for the prescribed attribute type based on the user selection preference.

8. The method of claim 1, further comprising selecting a plurality of the video content elements, from among available video content elements, for display of the respective identifiers concurrent with the displaying of the updated user selection interface, the selecting of the video content elements including identifying that the video content elements each have at least one media attribute having a substantial correlation with the selected position relative to the updated user selection interface.

9. The method of claim 8, wherein the selecting includes filtering the plurality of the video content elements based on a determined user selection preference.

10. The method of claim 1, wherein the prescribed attribute type includes one of a content-based attribute type or a user mood-based attribute type, the content-based attribute type containing the media attributes for describing at least one video content element, the user mood-based attribute type containing the distinct media attributes correlated to respective user moods.

11. An apparatus comprising:
a processor circuit configured for generating, for display to a user, a user selection interface having an origin, the user selection interface enabling simultaneous multidimensional navigation toward one or more video content elements based on representing a plurality of content selection vectors extending from the origin and mapped to respectively distinct media attributes within a prescribed attribute type; and
a user interface circuit configured for detecting a user input that extends from the origin toward at least one of the content selection vectors and that identifies a selected position within the user selection interface;
the processor circuit further configured for generating, for display to the user, an updated user selection interface in response to interpreting the selected position of the user input as having a determined correlation toward the corresponding distinct media attribute of the at least one content selection vector, the updated user selection interface having a corresponding updated origin at the selected position and representing a plurality of updated content selection vectors having a determined relative correlation to the at least one content selection vector;
the processor circuit further configured for selecting, for display to the user concurrent with the display of the updated user selection interface, at least one identifier for a corresponding video content element having the corresponding media attribute having a highest correlation with the at least one content selection vector relative to the selected position from the origin.

12. The apparatus of claim 11, wherein the processor circuit is configured for generating and adding to the at least one identifier a media attribute indicator based on the corresponding media attribute, the media attribute indicator identifying a relative position of the corresponding video content element within the updated user selection interface.

13. The apparatus of claim 12, wherein the processor circuit is configured for generating and adding to the at least one identifier a media source identifier identifying a source of the corresponding video content element from among multiple video sources.

14. The apparatus of claim 12, wherein the processor circuit is configured for generating and adding to the media attribute indicator a first vector correlation indicator indicating a corresponding correlation of the media attribute of the corresponding video content element to at least one of the updated content selection vectors, to identify the relative position of the corresponding video content element within the updated user selection interface.

15. The apparatus of claim 14, wherein:
the processor circuit is configured for generating the user selection interface in two dimensions and centered at the origin;
the processor circuit configured for generating and adding to the media attribute indicator a second vector correlation indicator indicating the corresponding correlation of a second media attribute of the video content element to a second one of the updated content selection vectors, for concurrent display with the first vector correlation indicator to identify the relative position of the corresponding video content element within the updated user selection interface.

16. The apparatus of claim 11, wherein the processor circuit is configured for selecting the origin based on identifying the user, and determining a user selection preference of the user relative to the prescribed attribute type.

17. The apparatus of claim 16, wherein the processor circuit is configured for selecting the content selection vectors for the prescribed attribute type based on the user selection preference.

18. The apparatus of claim 11, wherein the processor circuit is configured for selecting a plurality of the video content elements, from among available video content elements, for display of the respective identifiers concurrent with the displaying of the updated user selection interface, the processor circuit configured for selecting the video content elements based on identifying that the video content elements each have at least one media attribute having a substantial correlation with the selected position relative to the updated user selection interface.

19. The apparatus of claim 18, wherein the processor circuit is configured for selecting the plurality of the video content elements based on filtering from among available video content elements based on a determined user selection preference.

20. The apparatus of claim 11, wherein the prescribed attribute type includes one of a content-based attribute type or a user mood-based attribute type, the content-based attribute type containing the media attributes for describing at least one video content element, the user mood-based attribute type containing the distinct media attributes correlated to respective user moods.

21. Logic encoded in one or more tangible media for execution and when executed operable for:
generating and displaying, to a user, a user selection interface having an origin, the user selection interface enabling simultaneous multidimensional navigation toward one or more video content elements based on representing a plurality of content selection vectors extending from the origin and mapped to respectively distinct media attributes within a prescribed attribute type;
detecting a user input that extends from the origin toward at least one of the content selection vectors and that identifies a selected position within the user selection interface as a user selection having a determined relative correlation toward the corresponding distinct media attribute of the at least one content selection vector;

generating and displaying to the user an updated user selection interface in response to the user input, the updated user selection interface having a corresponding updated origin at the selected position and representing a plurality of updated content selection vectors having a determined relative correlation to the at least one content selection vector; and selecting and displaying to the user, concurrent with the displaying of the updated user selection interface, at least one identifier for a corresponding video content element having the corresponding media attribute having a highest correlation with the at least one content selection vector relative to the selected position from the origin.

22. An apparatus comprising:

means for generating, for display to a user, a user selection interface having an origin, the user selection interface enabling simultaneous multidimensional navigation toward one or more video content elements based on representing a plurality of content selection vectors extending from the origin and mapped to respectively distinct media attributes within a prescribed attribute type; and a user interface circuit configured for detecting a user input that extends from the origin toward at least one of the content selection vectors and that identifies a selected position within the user selection interface;

the means for generating further configured for generating, for display to the user, an updated user selection interface in response to interpreting the selected position of the user input as having a determined correlation toward the corresponding distinct media attribute of the at least one content selection vector, the updated user selection interface having a corresponding updated origin at the selected position and representing a plurality of updated content selection vectors having a determined relative correlation to the at least one content selection vector;

the means for generating further configured for selecting, for display to the user concurrent with the display of the updated user selection interface, at least one identifier for a corresponding video content element having the corresponding media attribute having a highest correlation with the at least one content selection vector relative to the selected position from the origin.

* * * * *